United States Patent Office 3,230,284
Patented Jan. 18, 1966

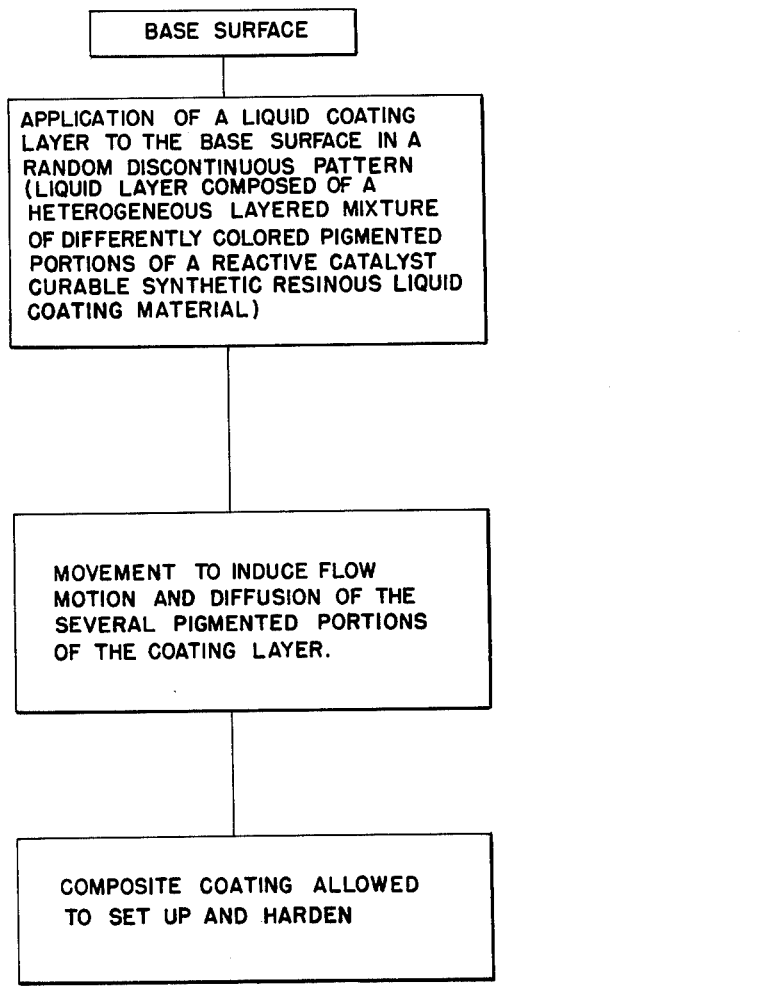

1

3,230,284
ONE-COAT MARBLEIZING PROCESS
Elizabeth M. Iverson, Wayzata, Minn., Harold E. Pohl, Kankakee, Ill., and Clayton E. Workman, Minneapolis, Minn., assignors to General Mills, Inc., a corporation of Delaware
Filed Sept. 18, 1963, Ser. No. 309,640
8 Claims. (Cl. 264—73)

This application is a continuation-in-part of our copending application, Serial No. 834,916, filed August 20, 1959 and now abandoned.

This invention relates to a new and improved one-coat process for the production of synthetic coatings in simulation of marble and like natural stone substances. More particularly, this invention relates to a one-coat method for making a hard, durable, realistic-appearing marbleized coating which is resistant to the effects of scuffing, abrasion, heat and most common stains, acids and solvents.

The process of this invention is useful for the production of decorative and ornamental protective coatings in simulation of variegated marbles, agates, onyx, Mexican onyx, banded alabaster and the like wherein variegated colors are arranged in veins, strips or bands or blended in clouds or showing moss-like forms and variations thereof, such as commonly appear in nature. The marbleized products according to this invention may be produced on a wide variety of bases including woods; plasterboards; beaver-boards; pressed woods, such as those sold under the trademarks "Masonite" and "Timblend;" various pressed fiber boards; cardboard; asbestos board; paper; textile fabrics, plastic sheets; fiberglass; cement blocks; bricks; straw mat; insulating batts and the like; or as a self-sustaining sheet.

The marbleized products are useful for the production of walls; floors; architectural facings; fireplaces; tops for tables, counters, vanities, desks and the like; in tile form for all purposes for which marble, ceramic and plastic tile is used; bases for lamps, desk sets, sculpture and the like; and in general, for all of those purposes for which natural marble and like natural stone materials are used. The marbleized finish produced according to this invention is superior to the finish of natural marble in many respects in that it is substantially non-porous and, therefore, non-absorbent and its surface cannot be penetrated by water, grease, cigarette stains, and the like.

In general, the marbleizing process for producing marbleized finishes according to this invention may be carried out using any two component coating material of the type which sets up and hardens as the result of the addition of acatalyst which acts as a curing agent or accelerating agent. Preferred coating materials are the polyester resin-based protective coating compositions. Suitable polyesters are the polymerizable unsaturated polyesters such as those prepared from ethylenically unsaturated polycarboxylic acids and polyhydric alcohols. Such coating materials may also contain a copolymerizable ethylenically unsaturated compound such as styrene. Exemplary polyester resin-based protective coating materials are disclosed in the commonly assigned application of Robert P. Arens entitled "Coating Composition," Serial No. 768,043, filed October 20, 1958 and now abandoned. Other coating materials may also be used. Examples of such materials are the epoxy resins.

The marbleizing process is carried out by first preparing two or more pigmented portions of coating resin of complementary or contrasting colors or different shades of the same color. The pigmented compositions are prepared in approximately the same proportions as it is desired that the various colors shall appear in the finished marbleized surface. The several separately prepared pigmented compositions are then poured into a common container and without appreciable admixing are poured onto the surface to be coated. During or immediately after pouring of the resulting heterogeneous mixture pigmented compositions onto the surface to be coated, the surface is subjected to action to induce gravity flow or wave motion in the liquid coating composition to cause diffusion and intermingling of the several pigmented compositions in an irregular variegated pattern in resemblance of natural marble. The flow of pigmented resins may be induced by oscillating or tilting or vibrating the surface to which the marbleized coating is applied or by directing gas jets against the liquid coating. The pigmented portions of coating resin are preferably catalyzed before application to the work piece although in some instances catalysis may be deferred until after application.

Because the several pigmented resin compositions have virtually the same specific gravity, there is relatively little intermingling or blending of the colors at the interface between the separate layers when the pigmented compositions are carefully poured into a common container. However, when the several pigmented coating materials are poured from the common container, portions of each of the several layers flow out together as a heterogeneous mixture and are deposited on the surface to be marbleized in the form of stripes or streaks of color. The grain of the final marbleized surface is determined to some extent upon the width of the stream of pigmented resin portions poured together from their common container. The smaller spout or opening produces a finer grain.

Depending on the flow motion and agitation to which they are subjected, the adjacent portions of the different pigmented compositions may show sharp lines of demarcation or, where the colors are admixed, there may be gradations of color where the compositions are blended together. The colors may be applied in generally longitudinal stripes, in swirls, in a zigzag pattern, etc. in simulation of naturally occurring patterns of veining, stratification, faults, fossile implantations, etc. Just as an infinite number of naturally occurring marbleized patterns are possible without duplication, an infinite number of varieties of designs, patterns and colors in simulation of natural marble is possible through practice of the present invention.

Intermingling and blending of colors is heightened by the induced flow of the liquid pigmented resin compositions after application to the surface to be marbleized. The surface may be tilted or oscillated or vibrated to cause greater flow and movement in one direction than the other by varying the angle and rate of flow. Initially, the layered mass of different colored coating resin poured from a common container may be applied to less than all of the surface to be coated and the coating material is then permitted to flow by virtue of tilting and oscillation of the work surface to the edges of the surface so as to completely cover the surface to be coated. For some uses where edge finishing is desirable, the marbleizing coating is permitted to run over the edges of the work piece. After the desired variegated marbleized pattern has been produced by flow of the coating material to blend and diffuse the varied colored portions of the coating composition, the work surface is held flat and level to permit the coating to set up and harden as a smooth uniform surface layer.

The color pigments applied are inert, inorganic, finely divided color bodies admixed from dry powder or paste form in a predetermined portion of a base resin material. In some instances where the work surface is precoated or otherwise is of a background texture and color not incompatible with the desired marbleized finish, one portion of the base resin may be left unpigmented to provide some localized areas of greater transparency or translucency in simulation of some naturally occurring stone formations. Where it is desired to impart a further three-dimensional quality to the ultimate marbleized finish, a further layer of transparent unpigmented coating composition comprised of the same resin base as the variegated pigmented layer may be applied on top of the variegated pigmented layer preferably before that layer has set up and hardened.

The mableized finish is preferably permitted to set up and harden in air or in a baking or drying oven or, in the case of certain air-inhibited coating resins, the coating may be cured while sealed from contact with air, as explained in greater detail hereinafter. After the surface has hardened, it can be sanded to give it a smooth surface and then buffed to a high polish. The air-inhibited coatings which are permitted to set up in contact with a smooth polished surface require no sanding or polishing. When a self-sustaining film or sheet is to be formed, the variegated pigmented base layer is applied to a surface from which the composite coating may be stripped after it is set up. Such surfaces include polished metal, glass, cellophane, "Mylar" (duPont's polyethylene terephthalate film), waxed and greased surfaces and the like. Each of the portions of the pigmented coating layer is composed of a two-component resinous coating material including a base resin portion and a catalyst portion. In general, each layer is preferably catalyzed before application to the work surface. After the catalyst component is incorporated into the base resin, the composite coating begins to set up almost immediately but usually requires a period of from a few minutes to several hours to set up completely and harden. For this reason, it is imperative that the catalyzed coating material be used shortly after the catalyst is added to the base resin. However, if the composite coating material containing both base resin and catalyst is kept cold until application, the materials may be prepared somewhat prior to use. Alternatively, instead of admixing the base resin portion of the coating and the catalyst component prior to application, the several pigmented portions of the base resin coating may be initially applied and thereafter, when the marbleized pattern has been created, they may be catalyzed simultaneously by exposure to the catalyst in vapor form.

The marbleizing coating may be applied to a flat horizontal work piece which is later vibrated, tilted or oscillated, or to an inclined work piece or the work piece may be moving during application of the pigmented portions of the coating. Flow of coating material and formation of the marbleized design occurs primarly under influence of gravity. The application of the mableizing coating of this invention is not limited to plane surfaces, however, but may be aplied to cylindrical bases and other surfaces having a generally circular cross section by mounting the work piece so that it can be slowly rotated about its longitudinal axis in a horizontal plane at a slow rate just sufficient to prevent sagging and running of the coating material. To assist in the application of marbleized coatings to such rotating surfaces, it is desirable to use coating materials having thixotropic properties. The veining and striations may be formed either longitudinally or circumferentially with respect to the rotating base. Where the striations are formed to run generally longitudinally, they are formed on opposite sides of the base in simulation of natural formations in which the strata lie generally in planes and extend through from one side to the other of the work piece. Illustrative of this, one may consider a sphere turned from veined marble. When viewed from one side, the veins will appear generally as a series of lines whereas when viewed from another side at a right angle to the first, the veins appear as a series of generally concentric circular lines. The same effect can be simulated by the process of this invention.

For many purposes it is desirable to coat all of the surfaces of the work piece being coated. For example, architectural panels, tiles, etc., are preferably given a seal coat on the back and all edge surfaces. This seal coat need be marbleized only if it is to be visible but, more often is the same as the predominant color of the pigmented marbleized coating. Panels and tiles for outdoor use are preferably klin dried.

The single figure of the drawing is a flow-sheet illustrating the process of the present invention.

The invention is further illustrated by the following examples:

*Example I*

A veined white marbleized surface coating is prepared by initially admixing 100 parts of a medium reactivity thermosetting unsaturated polyester resin, 73 parts styrene, 0.37 part cobalt naphthenate accelerator, 0.63 part ultraviolet absorber and 4.5 parts propyl formate. This base resin mixture is catalyzed by the admixture of 8 parts by weight of a catalyst solution comprised of 100 parts by weight of methyl ethyl ketone peroxide (60% solution in dimethyl phthalate) and 3 parts peroxyacetic acid (30% solution in dimethyl phthalate). The resulting mixture is essentially clear and transparent in thin layers. It is divided into three portions, one of which is approximately equal to one half of the total and is pigmented by the addition of 5 parts by weight of a white (anatase) titanium dioxide pigment. Two separate smaller batches of pigmented base resin of the same composition are made up, each being equal to about one fourth of the total. One is a thin fluid paste of black finely divided inorganic carbon black pigment and the other is gray, colored with a mixture of titanium dioxide and carbon black.

These thee pigmented pastes are then poured into a common container with the gray layer on the bottom, the black layer intermediate and the white layer on top, care being taken in pouring to avoid intermixing of the colors, although some slight blending at the interfaces is inevitable and not objectionable. This composite pigmented and layered composition is then poured in an irregular pattern over a slab of "Timblend" pressed wood fiber board supported so as to be horizontal and substantially level. The pigmented material pours from the common container (which may simply be a can shaped to have a pouring spout) as a heterogeneous striped or streaked mixture and is applied in generally longitudinal narrow streaks although, in some areas, irregular blobs and swirls of the pigmented materials, either separately or intermingled, are applied to the base. The pigmented material is applied in relatively thick masses to about half of the total surface area of the top of the slab. The base slab is then tilted with an irregular motion from side to side and from end to end to induce flow of the pigmented resin so that the resin spreads out over the entire top surface of the work piece and at the same time creates a marbleized design in the coating.

The liquid coating material is agitated sufficiently to cause some intermingling and blending of colors between adjacent white, gray and black localized areas without causing an overall homogeneous blending or intermingling of colors. The pigmented compositions, being relatively thin and fluid, flow together to some extent to present a continuous surface coating or film having an irregular discontinuous non-uniform pattern in simulation of natural stone formations.

When catalyzed in advance of application, the preparation of the pigmented portions of the coating resin, the pouring together of the several colors in separate layers in a common container, the application to the base work piece and the manipulation of the work piece to blend the colors into a marbleized pattern must all be done relatively quickly before the coating material has an opportunity to set up to such an extent that flow is inhibited. Depending upon conditions, such as temperature, amount of catalyst, etc., this period may range from several minutes to several hours. Although the several pigmented portions of the coating material have substantially the same specific gravity, the marbleizing pigments themselves may have somewhat different specific gravities. The marbleizing pigments tend to seek their own level within the coating layer. The heavier pigments and larger agglomerated masses tend to sink and diffuse into the depth of the coating layer and the lighter pigments and lighter and finer masses tend to rise to some extent and diffuse into the surface. The result is a three dimensional effect in simulation of the depth of strata present and visible in natural marble and like materials and the product at this stage assumes the appearance of natural marble. Because the pigments are distributed throughout the thickness of the coating layer, the marbleized pattern will not wear off as in the case of surface printed marbleized materials.

Because the polyester composition comprising the base resin is of the air-inhibited type, it is necessary to exclude air in order that the marbleized coating layer will set up and harden. A sheet of cellophane film is then applied over the variegated pigmented layer while it is still unset and is gently smoothed with a roller or the like into intimate contact with the top surface of the coating layer and to remove any entrapped air which might be present. After several hours the cellophane film is stripped off and the composite marbleized coating has become set and hardened. Its surface mirrors the smooth glossy surface of the cellophane film so that no buffing or polishing is required. The resultant product closely resembles natural white marble having black and gray veining.

*Example II*

A further simulated marble slab is produced by making up an uncatalyzed base resin mixture containing 100 parts of polyester resin, 59.6 parts styrene monomer and 0.37 part cobalt naphthenate accelerator and dividing into two portions, one of which is pigmented with one inorganic pigment of appropriate color. Pigment pastes of three different colors are made up in the same uncatalyzed base resin and all of the colors are applied together from separate layers in a common container in a random discontinuous pattern over the surface of a base panel supported so as to be horizontal and level.

The panel is tilted from side to side and end to end until the coating material has spread over the entire top surface of the panel and the several colored portions have blended and intermingled in an irregular pattern. The entire panel is then placed in a closed chamber where it is maintained level and exposed to catalyzing vapors, formed by vaporizing a solution of 100 parts methyl ethyl ketone peroxide containing three parts peroxyacetic acid, and set up and hardened.

*Example III*

An epoxy resin marbleized surface coating is produced by the use of a commercial reactive type amine cured epoxy resin marketed in a two-package system along with its curing agent. The curing agent and resin are admixed and divided into three portions which are pigmented with commercial paste colors ("Ferro") and applied from separate layers in a common container to an asbestos board panel in the random discontinuous variegated color pattern as in the other examples. The coated panel is vibrated to cause the pigment colors to flow and diffuse and produce the simulated marble pattern. The marbleizing epoxy coating is permitted to set up and harden in air. It is then buffed and polished and the resulting coated slab is generally comparable to a marble building facing panel but is superior in some respects in that the surface is non-porous and more resistant to stain and wear than is natural marble.

*Example IV*

A self-sustaining flexible marbleized film is produced by applying the catalyzed flexible coating composition of Example II upon a horizontal polished plate glass slab. Several portions of coating resin containing separate and distinct marbleizing pigments are applied from a common container. The slab is tilted from end to end and side to side to diffuse the colors of the several portions of pigmented resin. The marbleized coating is permitted to set up and harden in air. The surface is buffed and polished. Then the composite coating is stripped from the glass base. The resulting marbleized film is flexible and may be easily cut and bent for application by adhesive to irregular and curved surfaces.

The above examples illustrate but a few of the many variations in materials and methods of application and treatment which are useful in carrying out the present invention. Since natural marbles, alabaster, onyx and like decorative stone materials appear in almost infinite variety of colors and patterns, the invention is unlimited by either the colors which are employed or the patterns in which they are arrayed. Bits of mica or metal foil or flecks of iridescent material, etc., can be dispersed at random through one or more of the pigmented portions of coating resin in simulation of the micaeous and metallic substances which are often found in nature. The pattern of the marbleized coatings and films according to this invention extends all of the way through the resin layer. While wear of the surface may cause slight and interesting changes in pattern, similar to natural marble, the marbleized pattern will last as long as the resin layer remains.

The polyester compositions of Examples I, II and IV may be catalyzed with benzoyl peroxide in either crystal or solution form as well as with other of the soluble organic peroxide catalysts. Those catalysts which are relatively slow acting and produce compositions having relatively long pot lives can be incorporated to catalyze the resin in advance of use whereas the catalyzed resins with short pot lives must not be catalyzed until just prior to use.

Where epoxy resin is used as the coating material in most instances it need not be sanded or buffed for it dries with a very high gloss finish. The overall appearance of the epoxy marbleized surface is somewhat different from the polyester marble in that the diffusion results in a finer and more lacy pattern with small blobs of color that take on a shell-like appearance and some of the colors diffuse into each other to make a new shade, such as pink and blue diffusing to make lavender.

If desired, a top layer of clear transparent coating material may be applied to the marbleized surface on top of the variegated pigmented layer after it has set up, hardened and been sanded and buffed. If the clear layer is left unsanded and unbuffed, it presents a soft satin finish. A high gloss may be produced by light sanding and buffing.

Where the marbleized layer is applied to a coarsely porous material, it may be necessary to apply a finishing transparent coating to produce a smooth surface. Alternatively, coarsely porous base material may be provided with an underlying seal coat prior to marbleizing.

It is apparent that many modifications and variations of this invention as hereinbefore set forth may be made without departing from the spirit and scope thereof. The specific embodiments described are given by way of example only and the invention is limited only by the terms of the appended claims.

We claim:

1. A method of producing a marbleized surface coating in simulation of natural marble and the like which comprises: placing a plurality of differently colored, pigmented portions of a reactive, catalyst curable, synthetic resinous, liquid, coating material in a common container without appreciable admixing of said portions; pouring said liquid, heterogeneous, layered mixture onto a base surface in a random, discontinuous pattern; before the resulting layer of coating material has set up, subjecting the coated surface to movement to induce flow motion and diffusion of the several pigmented portions of the coating layer; and, thereafter, permitting the composite coating to set up and harden.

2. A method of marbleizing according to claim 1 further characterized in that the pigments used to color the liquid coating material are inert finely divided inorganic coloring substances.

3. A method of marbleizing according to claim 1 further characterized in that the plurality of differently colored, pigmented portions placed in the common container are fluid paste dispersions of pigment in the reactive, catalyst curable, synthetic resinous, coating material.

4. A method of marbleizing according to claim 1 further characterized in that the coating material is catalyzed prior to application to the base surface.

5. A method of marbleizing according to claim 1 further characterized in that said base surface is initially substantially flat and disposed horizontally and said flow motion and diffusion is induced by oscillating said surface.

6. A method of marbleizing according to claim 5 further characterized in that the liquid, heterogeneous, layered mixture is poured onto the base surface in a random pattern extending generally longitudinally of said base surface, and said surface action is initiated by tilting the base from side to side and from end to end whereby said pigmented portions blend and diffuse irregularly in a generally longitudinal direction with respect to said base surface in simulation of the veining of natural marble.

7. A method of marbleizing according to claim 1 further characterized in that the reactive, synthetic resinous, coating material is an unsaturated polyester resin.

8. A method of marbleizing according to claim 1 further characterized in that the base surface has a smooth non-adhering surface and after setting up and hardening the coating is stripped from said base surface.

References Cited by the Examiner
UNITED STATES PATENTS

| | | | |
|---|---|---|---|
| 1,623,967 | 4/1927 | Moross | 264—74 |
| 1,638,821 | 8/1927 | Bergen | 264—73 |
| 1,699,413 | 1/1929 | Tully | 264—73 |

ALEXANDER H. BRODMERKEL, *Primary Examiner.*